(12) United States Patent
Banadyga et al.

(10) Patent No.: US 10,363,703 B2
(45) Date of Patent: Jul. 30, 2019

(54) RADIAL LATTICE STRUCTURES FOR ADDITIVE MANUFACTURING

(71) Applicant: Within Technologies Ltd., London (GB)

(72) Inventors: Andriy Banadyga, Uxbridge (GB); Hooman Shayani, Longfield (GB)

(73) Assignee: Within Technologies Ltd., London (GB)

( * ) Notice: Subject to any disclaimer, the term of this patent is extended or adjusted under 35 U.S.C. 154(b) by 558 days.

(21) Appl. No.: 14/997,122

(22) Filed: Jan. 15, 2016

(65) Prior Publication Data

US 2016/0209820 A1    Jul. 21, 2016

Related U.S. Application Data

(60) Provisional application No. 62/104,583, filed on Jan. 16, 2015.

(51) Int. Cl.
*B29C 64/386* (2017.01)
*B29C 64/171* (2017.01)
*B29C 64/393* (2017.01)
*G05B 19/4099* (2006.01)
(Continued)

(52) U.S. Cl.
CPC .......... *B29C 64/386* (2017.08); *B29C 64/171* (2017.08); *B29C 64/393* (2017.08);
(Continued)

(58) Field of Classification Search
CPC ................ G05B 15/02; G05B 19/4099; G05B 19/4097; G05B 19/4103; B33Y 50/02;
(Continued)

(56) References Cited

U.S. PATENT DOCUMENTS 8,909,505 B2 * 12/2014 Heyring ................. H02N 99/00
  434/301
9,811,620 B2 * 11/2017 Ruto ................... G06F 17/5036
(Continued)

OTHER PUBLICATIONS

Unknown Author, "3D Printing—Wikipedia, the free encyclopedia," (Jan. 14, 2015) [online] (retrieved from http://en.wikipedia.org/wiki/additive_manufacturing), 19 pages.
(Continued)

*Primary Examiner* — Alonzo Chambliss
(74) *Attorney, Agent, or Firm* — Fish & Richardson P.C.

(57) ABSTRACT

Methods, systems, and apparatus, including medium-encoded computer program products, for designing three dimensional lattice structures include, in one aspect, a method including: creating nodes in a plane normal to an axis in accordance with a spiral, wherein proper subsets of the nodes occur at successive radii positions away from the axis in the plane normal to the axis; repositioning every other one of the proper subsets, from at least a portion of the nodes, in a direction in 3D space along the axis; creating a three dimensional (3D) structure in the 3D space, the 3D structure comprising beams placed between the repositioned and non-repositioned proper subsets; duplicating the 3D structure one or more times to form a lattice in the 3D space; and selecting at least a portion of the lattice for inclusion in a 3D model.

24 Claims, 10 Drawing Sheets

(51) Int. Cl.
*B33Y 50/02* (2015.01)
*B33Y 30/00* (2015.01)

(52) U.S. Cl.
CPC .......... *G05B 19/4099* (2013.01); *B33Y 30/00* (2014.12); *B33Y 50/02* (2014.12); *G05B 2219/49011* (2013.01); *G05B 2219/49018* (2013.01); *Y02P 90/265* (2015.11)

(58) Field of Classification Search
CPC ....... B33Y 30/00; B29C 64/386; B29C 64/00; B29C 64/10; B29C 64/171; B29C 64/393
See application file for complete search history.

(56) References Cited

U.S. PATENT DOCUMENTS

| | | | | |
|---|---|---|---|---|
| 10,026,213 B1* | 7/2018 | Arbree | ................... | G06T 15/06 |
| 2013/0260656 A1* | 10/2013 | Seth | ........................ | B24B 37/26 |
| | | | | 451/527 |
| 2014/0156053 A1* | 6/2014 | Mahdavi | ............. | B29C 67/0059 |
| | | | | 700/119 |
| 2014/0324204 A1* | 10/2014 | Vidimce | ............. | B29C 67/0088 |
| | | | | 700/98 |
| 2016/0133049 A1* | 5/2016 | Hill | ........................ | G06T 17/10 |
| | | | | 700/98 |
| 2016/0232262 A1* | 8/2016 | Shayani | .................. | G06T 17/10 |
| 2017/0209981 A1* | 7/2017 | Seth | ........................ | B24B 37/26 |

OTHER PUBLICATIONS

Unknown Author, "Archimedean spiral—Wikipedia, the free encyclopedia," (Jan. 2, 2015) [online] (retrieved from http://en.wikipedia.org/wiki/Archimedean_spiral), 4 pages.

Unknown Author, "Involute—Wikipedia, the free encyclopedia," (Jan. 2, 2015) [online] retrieved from http://en.wikipedia.org/wiki/Involute), 5 pages.

* cited by examiner high stress toward centre stronger areas softer/shock absorbing area    FIG. 7E

RADIAL LATTICE STRUCTURES FOR ADDITIVE MANUFACTURING

CROSS-REFERENCE TO RELATED APPLICATIONS

This application claims the benefit under 35 U.S.C. § 119(e) of U.S. Patent Application No. 62/104,583, entitled "RADIAL LATTICE STRUCTURES FOR ADDITIVE MANUFACTURING", filed Jan. 16, 2015, which is hereby incorporated by reference in its entirety.

BACKGROUND

This specification relates to structural designs for additive manufacturing, such as lattice structures created using three dimensional (3D) modeling programs for use with additive manufacturing or other manufacturing techniques.

Computer-aided design (CAD) software has been developed and used to generate 3D representations of objects. Such software has also included software tools that can be used to enhance 3D parts using lattices and skins of various sizes, thicknesses and densities. Such tools allow rapid redesign of a 3D part to be lighter in weight, while still maintaining desired performance characteristics (e.g., stiffness and flexibility). Such software tools have used lattice topologies of various types (e.g., X, W, Column, etc.) that can be used to generate internal structures that can be built using additive manufacturing, but these topologies are based on 3D grid unit cells and typically do not generate rotationally balanced lattice structures. In addition, such software tools have used Finite Element Analysis (FEA) techniques to simulate and optimize the performance of the redesigned 3D part.

SUMMARY

This specification describes technologies relating to structural designs for additive manufacturing, such as lattice structures created using 3D modeling programs for use with additive manufacturing or other manufacturing techniques.

In general, one or more aspects of the subject matter described in this specification can be embodied in one or more methods that include creating nodes in a plane normal to an axis in accordance with a spiral, where proper subsets of the nodes occur at successive radii positions away from the axis in the plane normal to the axis; repositioning every other one of the proper subsets, from at least a portion of the nodes, in a direction in 3D space along the axis; creating a three dimensional (3D) structure in the 3D space, the 3D structure including beams placed between the repositioned and non-repositioned proper subsets; duplicating the 3D structure one or more times to form a lattice in the 3D space; and selecting at least a portion of the lattice for inclusion in a 3D model. Other embodiments of this aspect include corresponding systems, apparatus, and computer program products.

The spiral can be a spiral with constant separation distance between successive turns of the spiral, and creating the nodes in the plane can include: creating the spiral; replicating the spiral with rotation in the plane normal to the axis; mirroring the replicated spiral; and using intersection points of the replicated and mirrored spirals as the nodes in the plane normal to the axis. The spiral can be an Archimedean spiral. The spiral can be a piecewise spiral. Further, creating the nodes in the plane can include: creating a first portion of the nodes from a radial grid; and creating a second portion of the nodes by connecting the first portion of the nodes in a crisscross pattern.

The method can include: placing additional beams between the repositioned proper subsets to form the 3D structure in the 3D space; and adding additional beams between the non-repositioned proper subsets to form the 3D structure in the 3D space. The method can include: selecting the portion of the nodes from which to reposition the proper subsets, selecting a portion of the lattice for inclusion in the 3D model, or both. In addition, moving every other one of the proper subsets can include moving each node a distance equal to an average of distances between the nodes in the plane normal to the axis.

One or more aspects of the subject matter described in this specification can also be embodied in one or more physical objects created by additive manufacturing, the physical object(s) including: multiple beams connected with each other at junction points to form a lattice of the physical object; where the beams of the lattice correspond to a duplicated three dimensional (3D) structure; where the 3D structure has (i) first sets of junction points at a first location along an axis for the 3D structure, and (ii) second sets of junction points at a second location, which is different from the first location, along the axis for the 3D structure; and where, when projected into a two dimensional (2D) plane normal to the axis, the first sets of junction points alternate with the second sets of junction points at successive radii positions away from the axis in the 2D plane normal to the axis.

The first sets of junction points and the second sets of junction points can have projection locations in the 2D plane that correspond to an Archimedean spiral. The first sets of junction points and the second sets of junction points can have projection locations in the 2D plane that correspond to a piecewise spiral. The physical object can include additional beams connected with the junction points. The first sets of junction points and the second sets of junction points can have projection locations in the 2D plane determined by one or more input parameters for a spiral. Moreover, in some cases, the beams of the lattice can be formed from only a portion of the duplicated 3D structure.

One or more aspects of the subject matter described in this specification can also be embodied in one or more systems that include a non-transitory storage medium having instructions of a three dimensional (3D) modeling program stored thereon; and one or more data processing apparatus configured to run the instructions of the 3D modeling program to (i) obtain an axis of rotation for a part of a 3D model of an object to be built using an additive manufacturing apparatus, (ii) generate nodes in a plane normal to the axis of rotation in accordance with a spiral, where proper subsets of the nodes occur at successive radii positions away from the axis of rotation in the plane normal to the axis of rotation, (iii) move every other one of the proper subsets, from at least a portion of the nodes, in a direction in 3D space along the axis of rotation, (iv) add beams between the moved and unmoved proper subsets to form a 3D structure in the 3D space, (v) mirror the 3D structure one or more times to form a rotationally balanced lattice in the 3D space, and (vi) provide at least a portion of the rotationally balanced lattice for inclusion in the part of the 3D model of the object. Other embodiments of this aspect include corresponding apparatus, methods, and computer program products.

The spiral can be a spiral with constant separation distance between successive turns of the spiral, and generating the nodes in the plane can include: generating the spiral using input parameters; mirroring the spiral in the plane normal to the axis of rotation; replicating the mirrored spiral with rotation in the plane normal to the axis of rotation; and identifying intersection points of the replicated and mirrored spirals as the nodes in the plane normal to the axis of rotation. Generating the spiral using the input parameters can include generating an Archimedean spiral using two of the input parameters being an angle value and a radius value, and replicating the mirrored spiral with rotation can include replicating the mirrored spiral a number of times within a full 360 degrees of rotation in accordance with a third of the input parameters.

The spiral can be a piecewise spiral, and generating the nodes in the plane can include: generating a radial grid using input parameters to generate a first portion of the nodes; and connecting the first portion of the nodes in a crisscross pattern to generate a second portion of the nodes. The one or more data processing apparatus can be configured to run the instructions of the 3D modeling program to add beams between the moved proper subsets to form the 3D structure in the 3D space, and add beams between the unmoved proper subsets to form the 3D structure in the 3D space.

The one or more data processing apparatus can be configured to run the instructions of the 3D modeling program to receive input parameters for the lattice in addition to the axis of rotation, where the generating can include generating the nodes in accordance with at least two of the input parameters, and where the moving can include: selecting the portion of the nodes in accordance with at least one of the input parameters; and moving every other one of the proper subsets from the selected portion of the nodes. Moving every other one of the proper subsets can include moving each node a distance equal to an average of distances between the nodes in the plane normal to the axis of rotation.

The one or more data processing apparatus can be configured to run the instructions of the 3D modeling program to enable selection of a portion of the rotationally balanced lattice for inclusion in the part of the 3D model of the object, and enable deformation of the rotationally balanced lattice either before or after the selection of the portion. In addition, the system can further include the additive manufacturing apparatus, where the one or more data processing apparatus can be configured to run the instructions of the 3D modeling program to generate the 3D model of the object with the rotationally balanced lattice included in the part of the 3D model.

One or more aspects of the subject matter described in this specification can also be embodied in one or more systems that include a non-transitory storage medium having instructions of a three dimensional (3D) modeling program stored thereon; and one or more data processing apparatus configured to run the instructions of the 3D modeling program to (i) obtain an axis of rotation for a part of a 3D model of an object to be built using an additive manufacturing apparatus, (ii) receive values for at least one size parameter to govern lattice cell size and an angle parameter to govern a number of wedges about the axis of rotation, (iii) generate nodes in 3D space using the axis of rotation and the received values, (iv) add beams connecting the nodes to form a rotationally balanced lattice in the 3D space, and (v) provide at least a portion of the rotationally balanced lattice for inclusion in the part of the 3D model of the object. Other embodiments of this aspect include corresponding apparatus, methods, and computer program products.

The one or more data processing apparatus can be configured to run the instructions of the 3D modeling program to generate the nodes in the 3D space using a spiral with constant separation distance between successive turns of the spiral. The spiral can be an Archimedean spiral, or other spirals.

The one or more data processing apparatus can be configured to run the instructions of the 3D modeling program to generate the nodes in the 3D space using a radial grid extended in a direction of the axis of rotation. The one or more data processing apparatus can be configured to run the instructions of the 3D modeling program to add the beams by connecting nodes of the extended radial grid in a crisscross pattern. In addition, the one or more data processing apparatus can be configured to run the instructions of the 3D modeling program to add the beams by further connecting nodes of the extended radial grid along straight and circular edges of the extended radial grid.

The one or more data processing apparatus can be configured to run the instructions of the 3D modeling program to receive (i) an integer input for the number of lattice cells around a circumference, (ii) a lattice cell size in the radial direction, (iii) a lattice cell size along the axis of rotation, and (iv) a minimum radius of an inner most boundary of the rotationally balanced lattice. The received lattice cell size in the radial direction and the received lattice cell size along the axis of rotation can both be held constant for all lattice cells of the rotationally balanced lattice, or one or both can be varied in size through the lattice structure.

The one or more data processing apparatus can be configured to run the instructions of the 3D modeling program to enable selection of a portion of the rotationally balanced lattice for inclusion in the part of the 3D model of the object, and enable deformation of the rotationally balanced lattice either before or after the selection of the portion. Further, the system can include the additive manufacturing apparatus, and the one or more data processing apparatus can be configured to run the instructions of the 3D modeling program to generate the 3D model of the object with the rotationally balanced lattice included in the part of the 3D model. Moreover, in some implementations, the one or more data processing apparatus can be configured to run the instructions of the 3D modeling program to enable selection of a lattice topology, where the added beams connecting the nodes correspond to the selected lattice topology, and the rotationally balanced lattice comprises a self-supporting, mechanically robust and efficient lattice structure that is manufacturable using additive manufacturing systems and techniques.

Particular embodiments of the subject matter described in this specification can be implemented to realize one or more of the following advantages. A method for generating cyclic symmetrical 3D lattice structures can be used with various additive manufacturing techniques and systems using various types of materials (including metal). An Archimedean spiral can be used as the basis for the 3D lattice structures. The 3D lattices can be of particular use in curved and/or cylindrical parts. A radial self-supporting and additive manufacturable lattice structure can be provided, where the radial lattice structure can be a rotationally balanced structure. A flexible solution for generating radial lattice structures for mechanical parts can be provided, where volume distribution of the 3D lattice within the part is predictable and balanced, along with being light weight and meeting the printability criteria of additive manufacturing processes. Moreover, the 3D lattice structure can be readily redesigned using different variables to fit design-space requirements for best stress distribution, and different 3D lattice structures can be designed for different purposes, such as lowering weight, cushioning, strength or shock absorbing.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIGS. 7A-7E show examples of modifications to 3D radial lattice structures.

Like reference numbers and designations in the various drawings indicate like elements.

DETAILED DESCRIPTION

Figure 1:
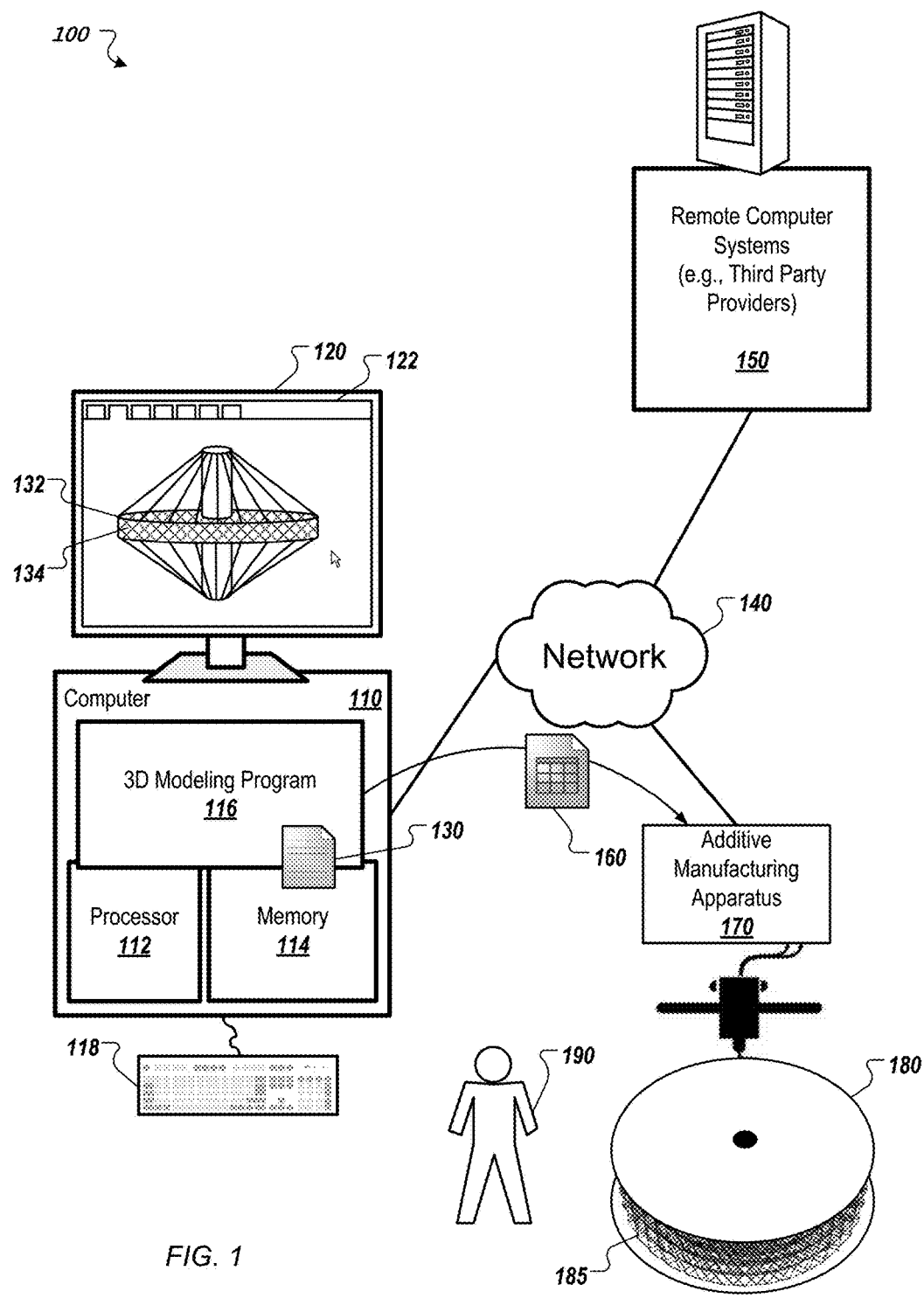
FIG. 1 shows an example of a system usable to design and build three dimensional (3D) radial lattice structures.

FIG. 1 shows an example of a system 100 usable to design and build three dimensional (3D) lattice structures. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs can include a 3D modeling program 116, which can run locally on computer 110 or remotely on a computer of one or more remote computer systems 150 (e.g., in a server system accessible by the computer 110 via the network 140). The 3D modeling program 116 presents a user interface (UI) 122 on a display 120 of the computer 110, which can be operated using one or more input devices 118 of the computer 110 (e.g., keyboard and mouse). Note that while shown as separate devices in FIG. 1, the display 120 and/or input devices 118 can also be integrated with each other and/or with the computer 110, such as in a tablet computer.

A user 190 can interact with the 3D modeling program 116 to create a 3D model 132. This can be done using known graphical user interface tools. In addition, the UI 122 of the program 116 can allow the user 190 to provide input defining a three dimensional lattice 134 associated with the 3D model 132. As shown, the model 132 is of a cylindrical part, which is common for objects that are manufactured, such as using traditional metal lathe tooling. With additive manufacturing, there is opportunity to make such parts lighter by creating internal structures. Simple cut-through sections are possible, but may not be efficient and cost effective for additive manufacturing, as these can be produced simply by casting or other traditional manufacturing methods at a lower cost. In contrast, use of internal lattice structures, such as the lattice 134, can reduce weight and increase strength, while being readily manufacturable using additive manufacturing systems and techniques.

A current restriction on additive manufacturing (AM) though is the minimum angle of overhang regions (the angle between the platform and the part's surface facing down). Overhang surfaces cannot be close to horizontal with today's AM machines. Therefore, the diameter to width ratio of a wheel should be Diameter/Width=1 (approximately) using traditional ways of designing internal structures. While future AM machines may solve this issue, it can be addressed today with improved part design. Using the systems and techniques described further below, a radial, self-supporting and additively manufacturable lattice structure 134 can be created and added to the model 132. In some cases, the lattice 134 can be rotationally balanced within the part. Moreover, the 3D modeling program can provide standard user interfaces through which the user 190 can design the lattice 134, as described herein, or the 3D modeling program 116 can be programmed with code and one or more additional user interfaces to facilitate creation of the lattice 134.

The 3D modeling program 116 can also facilitate manipulation of the 3D model 132, which can include adding, deleting, or changing components of the model 132, including components that intersect with the lattice 134, and also changing the extent and inclusion of the lattice 134 (e.g., by defining a containing envelope for the lattice structure 134). Once the user 190 is satisfied with the model 132 and its lattice 134, the 3D model 132 and its included lattice 134 can be stored as a document 130 and/or used to generate another representation of the model (e.g., an .STL file) with the lattice 134 included therein. This can be done upon request by the user 190, or in light of the user's request for another action, such as sending the 3D model 132 to an additive manufacturing apparatus 170 (which can be directly connected to the computer 110, or connected via a network 140, as shown). This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the 3D modeling program 116 can create an accurate representation of a combination of the 3D model 132 and the lattice 134, and provide a document 160 (of an appropriate format) to the additive manufacturing apparatus 170 to build a complete structure 180, including lattice structure 185. The additive manufacturing apparatus 170 can employ one or more additive manufacturing techniques, such as granular techniques (e.g., Selective Laser Sintering (SLS) and Direct Metal Laser Sintering (DMLS)), extrusion techniques (e.g., Fused Deposition Modelling (FDM)), and others. In addition, the user 190 can save or transmit the 3D model 132, with its lattice 134, for later use. For example, the 3D modeling program 116 can store the document 130 that includes the 3D model 132 and its lattice 134.

Figure 2A:
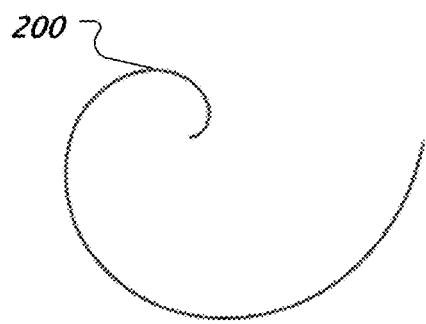
FIGS. 2A-2C show an example of using an Archimedean spiral to create nodes for use in creating a radial lattice structure.
Figure 2B:
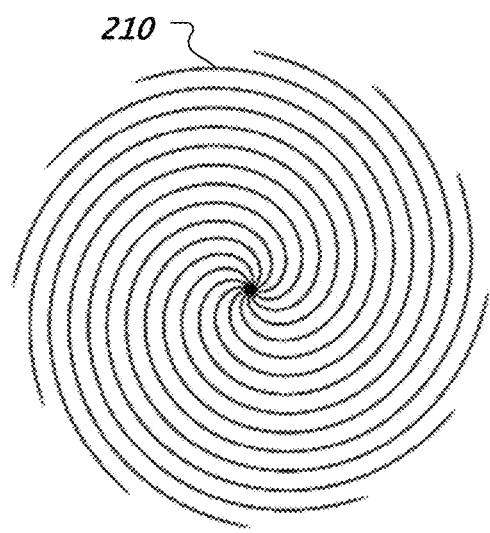
Figure 2C:
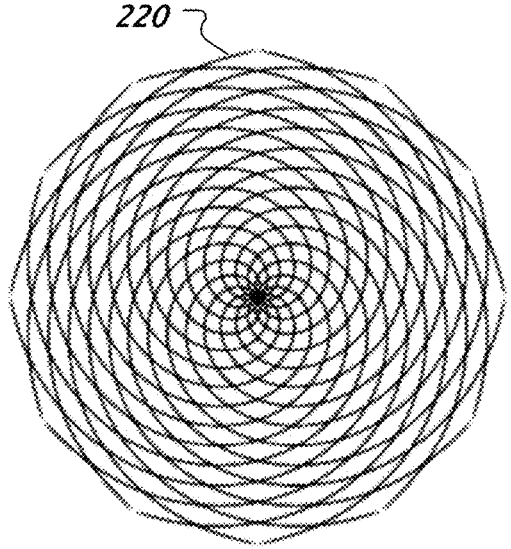

FIGS. 2A-2C show an example of using an Archimedean spiral 200 to create nodes for use in creating a radial lattice structure. The Archimedean spiral 200 can be predefined or it can be defined in accordance with a number of turns and a maximum distance from its center. In some implementations, two control parameters are used to control the Archimedean spiral 200 that is generated: an angle parameter, and a radius parameter. Various base spirals are possible, including base spirals that are not an Archimedean spiral (e.g., an involute of a circle, or a piecewise spiral, such as described further below). Archimedean spirals may be preferred since the radial lattice generated from such spirals often do not have significant differences in length between central and external beams generated therefrom, which allows a user to control inclination to base-surface more precisely, and stress distribution in the radial lattice structure will be generally smoother.

The base spiral is replicated with rotation along the center to generate a duplicated pattern 210 of the base spiral 200, as shown in FIG. 2A. In the example shown, the base spiral 200 is replicated eleven times for a total of twelve spirals. Various numbers of replications can be made within the full 360 of a circle. In some implementations, the number of replicated spirals in 360 degrees is another input variable.

The replicated pattern 210 is mirrored back onto itself to generate a flat radial structure 220, as shown in FIG. 2C. As will be appreciated, the ordering of the replicating and the mirroring doesn't matter. In some implementations, the base spiral 200 is mirrored first (along an axis that connects its ends), and the mirrored spiral is then replicated with rotation along the center. In either case, the resulting flat radial structure 220 locates nodes (at the intersections of the spirals) that are used to generate the 3D radial lattice structure.

Figure 3A:
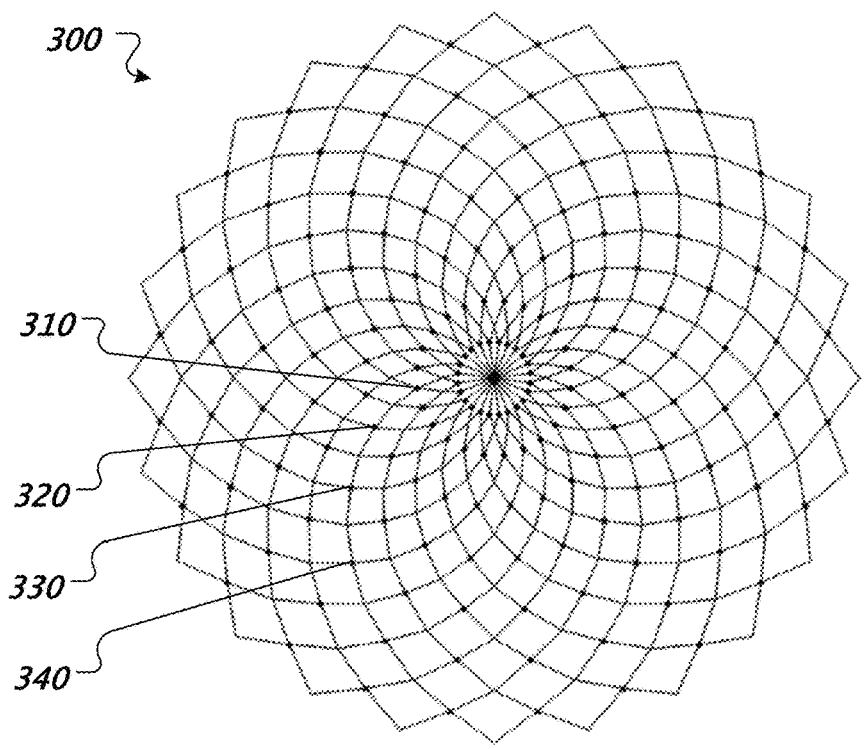
FIGS. 3A-3B show an example of creating a radial lattice structure from nodes of a flat radial Archimedean spiral structure.
Figure 3B:
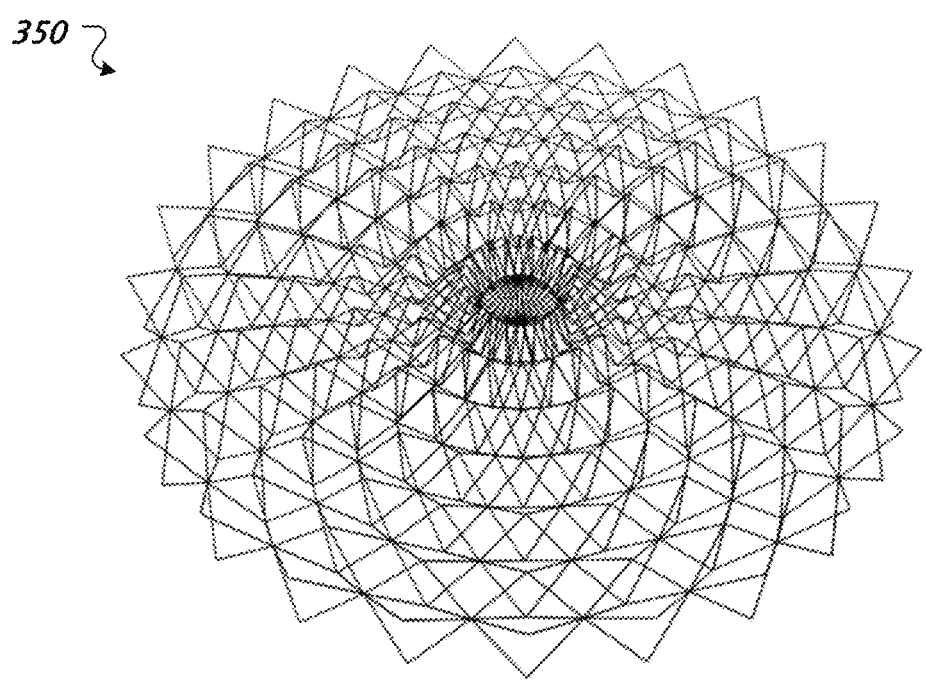

FIGS. 3A-3B show an example of creating a radial lattice structure from nodes of a flat radial Archimedean spiral structure 300. In the radial structure 300 of FIG. 3A, there are twenty four copies of a mirrored Archimedean spiral. As shown, the flat structure 300 has junctions (nodes) at different radii. These nodes can be grouped in an interleaved manner (every other radii) into two groups. As shown in FIG. 3A, one group of nodes are marked with dots added to the radial structure 300. This group of nodes thus includes nodes 310, 320, 330, 340, which belong to the marked nodes at the fifth, seventh and ninth radial positions, respectively, counting the center as the zeroth radial position.

One of these two groups of nodes can then be moved in a third dimension (out of the plane of the flat structure 300). For example, these nodes can be moved up along an axis that intersects the center of the flat radial structure 300 in FIG. 3A. In some implementations, the movement can be in an amount equal to about the average beam length of the flat structure 300. Note also that the beams between the moved an unmoved nodes can be added before the moving of the nodes (e.g., the beams can be defined previously in accordance with the spiral) or added after the moving of the nodes (e.g., the spiral is used to create the junctions of the lattice, and the beams of the lattice can be added later). In any case, a base 3D structure is created and can be vertically mirrored (at least once) to create a 3D lattice 350, as shown in FIG. 3B. Moreover, the base 3D structure can be mirrored one or more times, replicated, or both, to generate a radial lattice structure large enough to fill the internal support region of a part being designed.

Figure 4A:
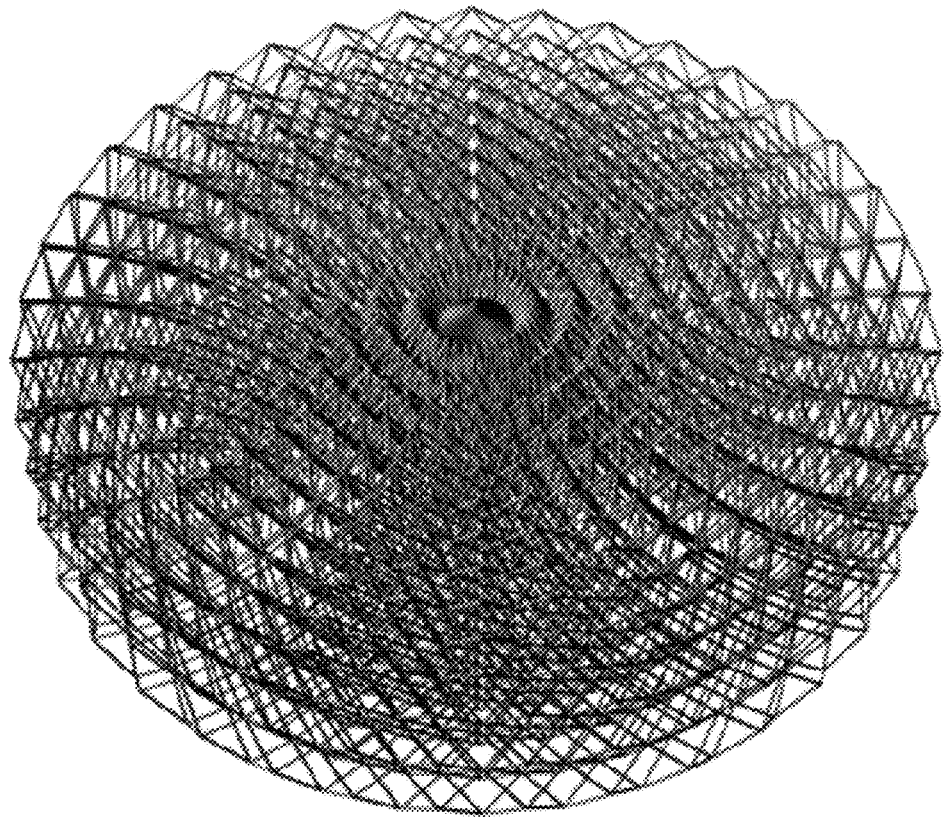
FIGS. 4A-4B show details of an example of a radial lattice structure.
Figure 4B:
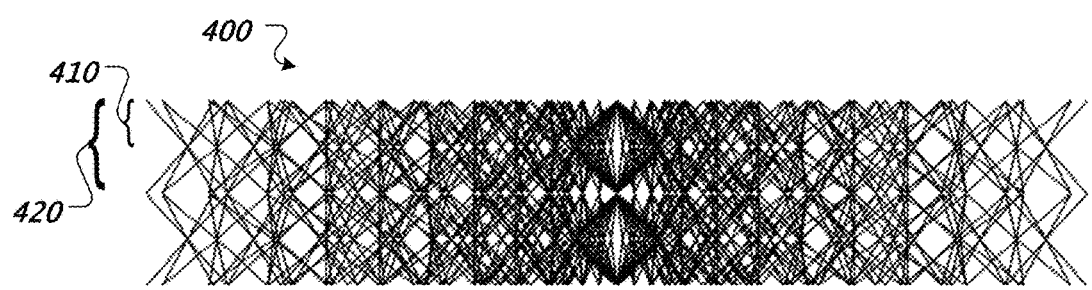

FIGS. 4A-4B show details of an example of a radial lattice structure 400. FIG. 4A shows a perspective view of the radial lattice structure 400, and FIG. 4B shows a side view of the radial lattice structure 400. A base 3D structure 410 has been vertically mirrored to generate a 3D lattice layer 420. The lattice layer 420 has been mirrored again (or replicated once) to generate the full lattice structure 400. The layer thickness (or Z dimension) of the lattice layer 420 is dependent on the thickness of the base 3D structure 410, which depends on the repositioning of the nodes done from the flat, duplicated spiral structure. In typical implementations, the layer thickness of the lattice layer 420 should be set to keep a minimum angle of about 45 degrees between the beams of the lattice and the base on which the lattice is built. In some implementations, for uniform beam thickness, the thickness can be set according to the following equation:

$$H(Z)=2*pi*R/Seg*\tan A;$$

where R is the external radius of the lattice structure, Seg is the number of radial segments, and A is a minimum required degrees of inclination angle.

Figure 5:
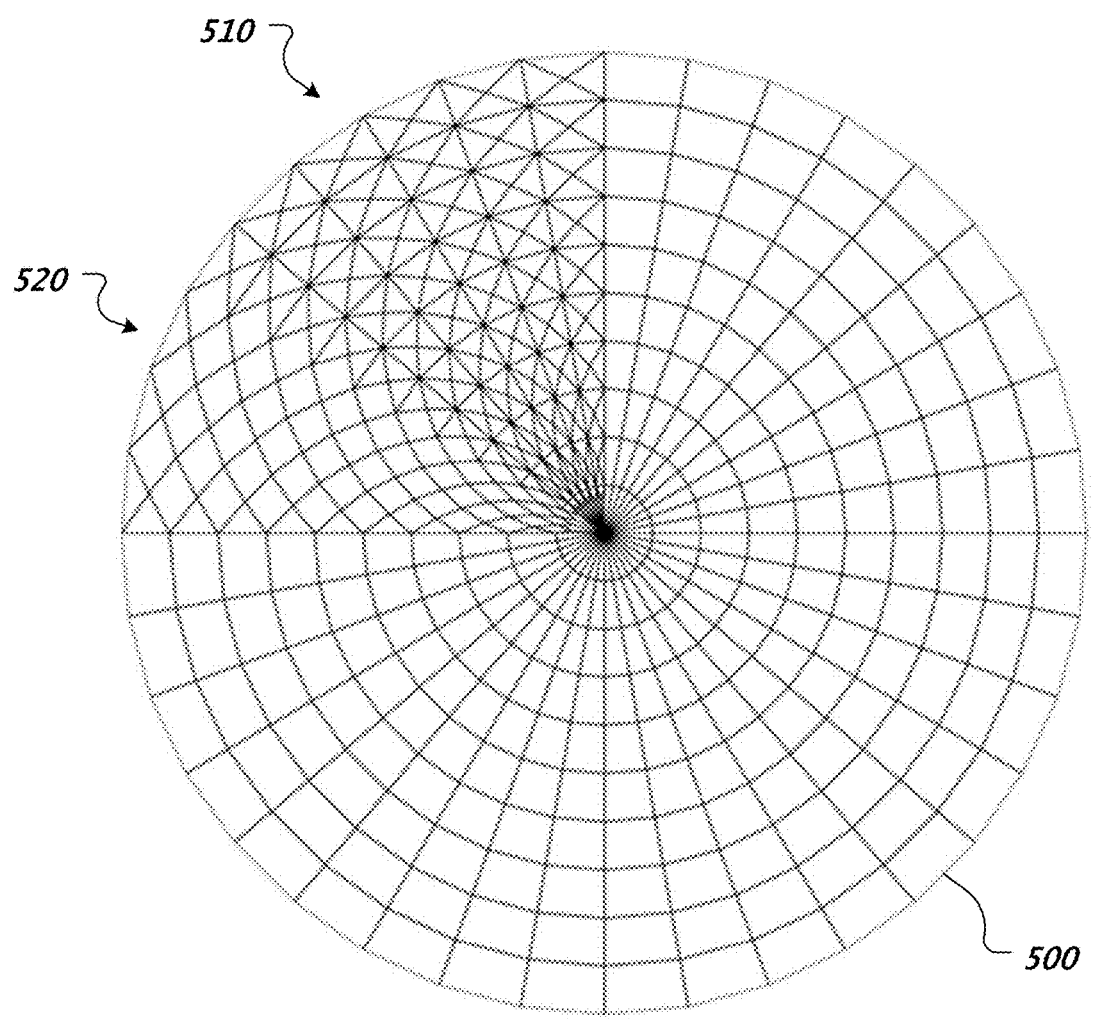
FIG. 5 shows an example of creating a flat radial lattice structure in accordance with a piecewise spiral.

In some implementations, an explicit spiral need not be used, and an implicit spiral can form the basis for the flat radial lattice that is changed into a 3D radial lattice. For example, the process can start with a radial grid 500, as shown in FIG. 5. The radial grid can be a uniform radial grid with uniform radius intervals and angles. This can then serve as a guide to connect the nodes in a crisscross pattern 510 with beams, and then continue as described above to create the 3D radial lattice structure. As before, the addition of the beams between moved and unmoved nodes can be done before the movement of the nodes in the Z direction (e.g., as part of the process of creating the crisscross pattern 510) or after the movement of the nodes in the Z direction. Moreover, the connections between moved nodes (and the connections between unmoved nodes) shown in FIG. 5 can be removed, as shown at 520 in FIG. 5, thus showing the implicit piecewise spiral. However, such connections can also be used as additional beams in the final lattice structure, both in the radial grid based implementations and the explicit spiral based implementations.

Figure 6:
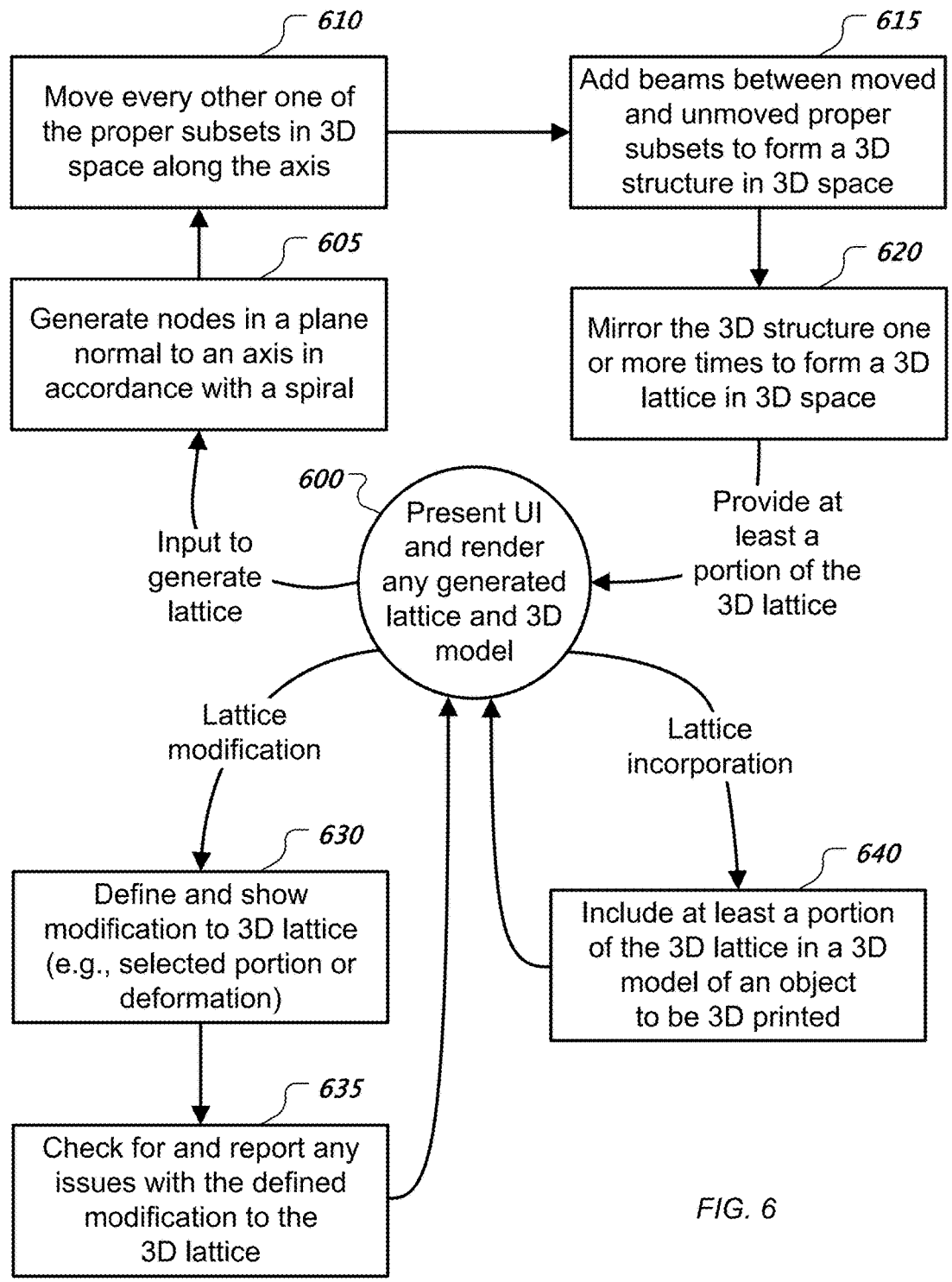
FIG. 6 shows an example of a process of designing and using 3D radial lattice structures.

FIG. 6 shows an example of a process of designing and using 3D radial lattice structures. At 600, a user interface (UI) of a 3D modeling program is presented, and any generated lattice, 3D model, or both are rendered to the display for the user to view. The user can provide input through the UI to generate a lattice. In some implementations, this can involve selection of a part of a 3D model (or an axis of rotation therefore) that is to have a radial lattice generated for it, based on the axis of rotation, before the part is build using additive manufacturing. Thus, an axis of rotation can be obtained for use in automatically generating a rotationally balanced lattice for inclusion in a part of a 3D model. In some implementations, this involves receiving input parameters, such as a spiral type (e.g., Archimedean spiral), a number of turns (e.g., an angle value for a spiral), and a maximum distance from the center (e.g., a radius value for the spiral). The input parameters can also include a value indicating a number of times to replicate the spiral within a full 360 degrees of rotation.

Figure 7A:
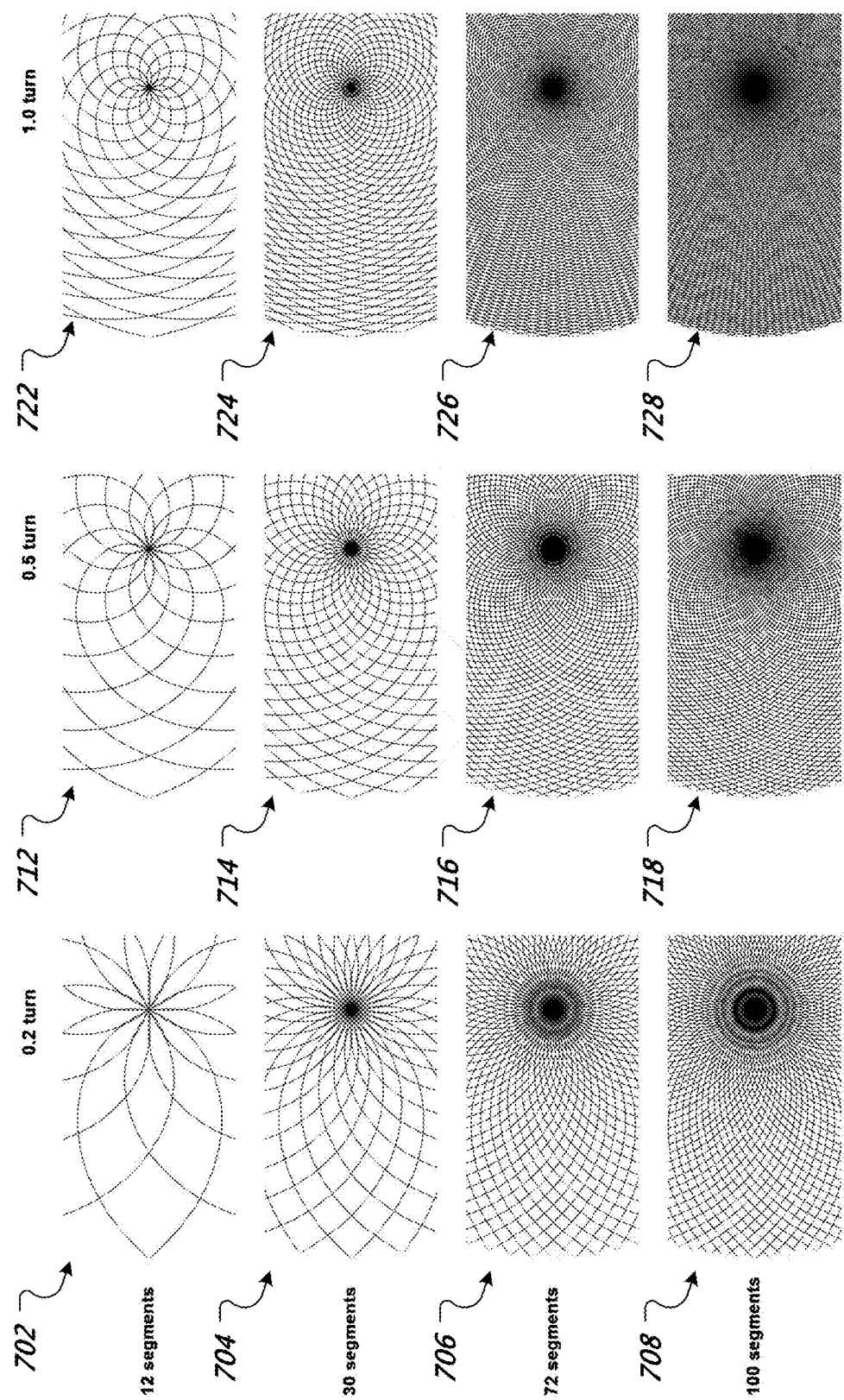

FIG. 7A show examples of modifications to 3D radial lattice structures based on such inputs. An example 702 shows a flat radial structure generated from twelve spiral segments at 0.2 turns. Examples 712 and 722 show flat radial structures generated from twelve spiral segments at 0.5 turns and 1.0 turns, respectively. An example 704 shows a flat radial structure generated from thirty spiral segments at 0.2 turns. Examples 714 and 724 show flat radial structures generated from thirty spiral segments at 0.5 turns and 1.0 turns, respectively. An example 706 shows a flat radial structure generated from seventy two spiral segments at 0.2 turns. Examples 716 and 726 show flat radial structures generated from seventy two spiral segments at 0.5 turns and 1.0 turns, respectively. An example 708 shows a flat radial structure generated from one hundred spiral segments at 0.2 turns. Examples 718 and 728 show flat radial structures generated from one hundred spiral segments at 0.5 turns and 1.0 turns, respectively.

Referring again to FIG. 6, when input indicates a lattice is to be generated, nodes of the lattice are generated at 605 in a plane normal to an axis in accordance with a spiral, where proper subsets of the nodes occur at successive radii positions away from the axis of rotation in the plane normal to the axis. This can be done using an explicit spiral (e.g., an Archimedean spiral or an involute of a circle) as described above in connection with FIGS. 2A-4B. Thus, the spiral can be a spiral with constant separation distance between successive turns of the spiral, and generating the nodes in the plane can involve generating the spiral using any provided input parameters, mirroring and replicating the spiral in the plane, and identifying the intersection points of the replicated and mirrored spirals as the nodes in the plane normal to the axis. Alternatively (or additionally), the node generation can be done using an implicit piecewise spiral, as described above in connection with FIG. 5, which can have similar input parameters as for the explicit spiral approach (e.g., a distance between circles, a number of circles, and a number of wedges, in radial grid based implementations). Thus, generating the nodes in the plane can involve generating a radial grid using the input parameters to generate a first portion of the nodes, and connecting the first portion of the nodes in a crisscross pattern to generate a second portion of the nodes. Note that this method can slightly shift new junctions toward the center of the lattice.

At 610, every other one the proper subsets at successive radii positions (from at least a portion of the nodes) are moved in a direction in 3D space along the axis (e.g., in a positive direction along an axis of rotation). The amount of movement can be controlled by the user, by formula (such as the equation above), by limitations set by the AM machine expected to be used, or a combination of these. In some implementations, some of the generated nodes can be excluded from the moving; as noted below, only a portion of a 3D lattice may be needed for a particular part design, and separate from the elimination of a portion of a generated lattice is the possibility of eliminating that portion of the lattice from being generated in the first instance. Thus, if a user is looking for a particular part of a radial lattice structure, this particular part can be specified up front by the nodes that are generated and moved, as well as after lattice generation.

At 615, beams are added between moved and unmoved proper subsets to form a 3D structure (e.g., the radial 3D structure 350 shown in FIG. 3B) in 3D space. The adding at 615 can occur before the moving 610, rather than after, as shown. For example, the beams can be added at the same time the nodes are generated at 605 (e.g., as a result of the spiral generation of the nodes). The beams can be curved (corresponding exactly to the spiral) or straight, but straight may be preferred since curved beam can increase the geometrical/virtual size of the model and the time needed for any Finite Element Analysis (FEA) analysis. Further, additional beams can be added at 615 to generate a denser lattice, such as adding beams between the moved proper subsets, and adding beams between the unmoved proper subsets. As before, this adding 615 can also occur before the moving at 610. For example, the beams can be added at the same time the nodes are generated at 605 (e.g., as a result of radial grid generation of the nodes).

At 620, the 3D structure is mirrored one or more times to form a rotationally balanced 3D lattice in the 3D space. This can involve vertical mirroring, as described above, and this can also involve replicating a 3D lattice layer one or more times. The mirroring and replication can also be made subject to user control, or a program can automatically do this until the 3D lattice structure is large enough to fill the part of interest. In any case, the 3D lattice can then be provided for potential further processing and inclusion in the part of the 3D model.

Figure 7B:
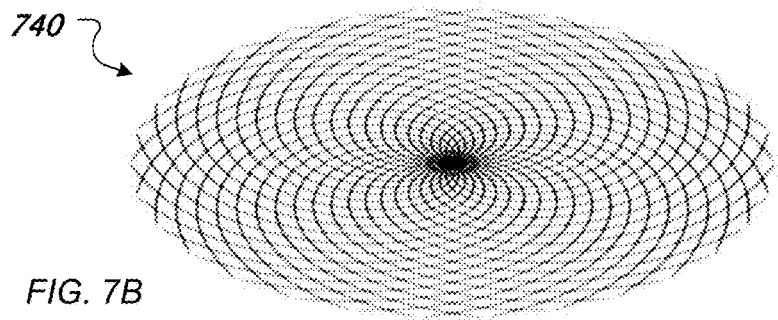

If the lattice is to be modified for inclusion in the model, such modifications to the 3D lattice can be defined and shown at 630. In some implementations, the 3D lattice can be deformed. In addition, such deformations can be performed at the point of node generation to make the deformation apply in only two dimensions. FIG. 7B shows an example of a flat radial lattice structure 740 that has been deformed before the 3D lattice is generated therefrom. Non-uniform scaling can be used to make the radial lattice suitable for different shapes and applications, where strength, light weighting, cushioning or shock absorbing are design objectives.

In addition, a portion of the 3D lattice can be selected at 630, such that only the specified portion of the 3D lattice is included in the part of the 3D model. At 635, a check can be made for any issues with the defined modification to the 3D lattice, and any necessary reporting to the user can be done. For example, if a lattice deformation has caused the beam angles (and thus overhang) to exceed the limits of the AM machine, this can be identified and reported to the user. Note that different AM machines have different limitations, depending on the material being used, but the inclination requirement will typically vary from 20 to 50 degrees. In some implementations, the equation H(Z)=2*pi*R/Seg*tan A can be used as a default value (but not a restriction) when constructing a lattice to help ensure the initial inclinations of the beams are around 45 degrees. In some implementations, a threshold minimum angle (e.g., 20, 30, 40, or 50 degrees, which can be selected based on the AM machine that will engage in the additive manufacturing process) can be used to check if any of the angles made by the beams of the lattice with a 3D build plane are too small.

Figure 7C:
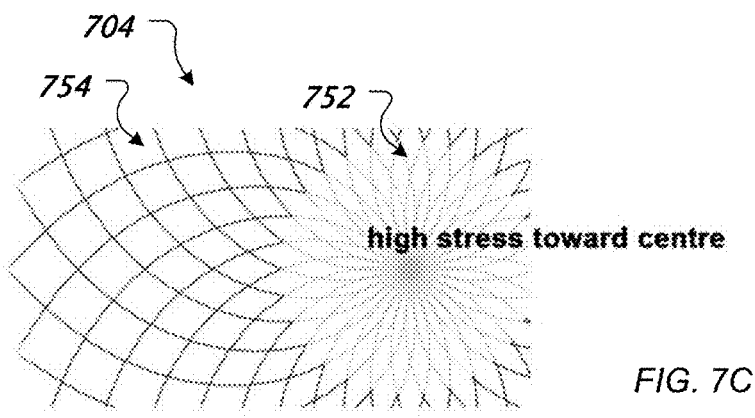
Figure 7D:
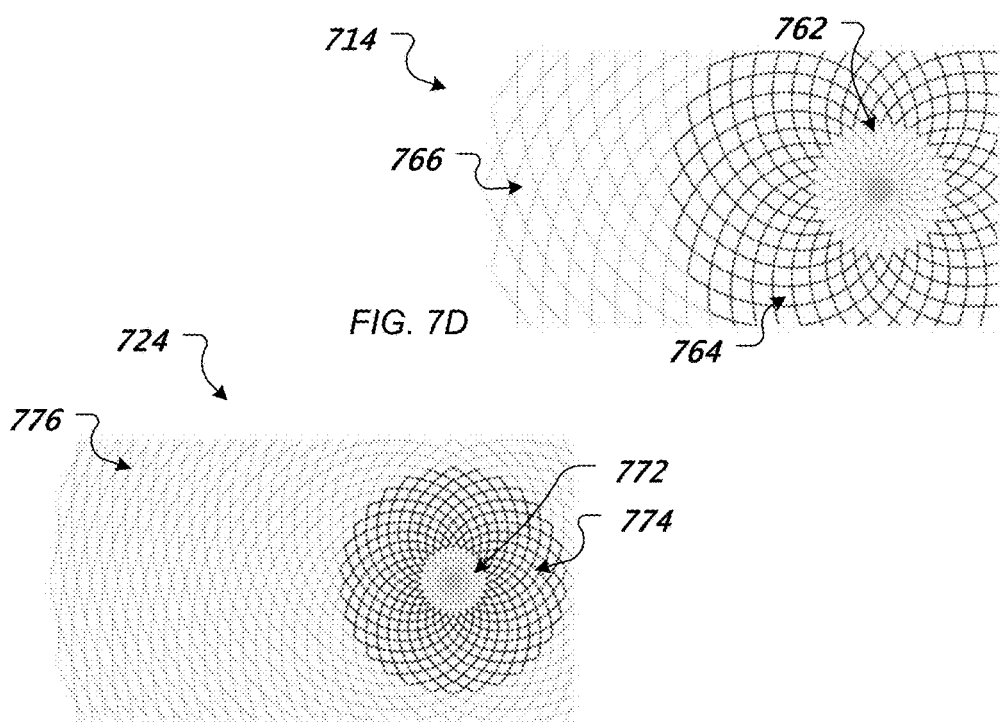

As another example of lattice modification, if the portion of the 3D lattice selected for use does not have the structural characteristics needed for the part being designed, this can be identified and reported to the user. For example, in some implementations, two threshold angles (e.g., 25 degrees and 155 degrees, which can be selected based on the desired structural characteristics identified by the user or the software) can be used as lower and upper bounds for the angles made by the beams of the lattice with each other. To further illustrate this, FIGS. 7C-7E show examples of how different portions of a 3D radial lattice can be used based on desired structural characteristics. FIG. 7C shows the example radial structure 704, in which an inner portion 752 of the structure 704 will have high stress levels approaching the center of the structure (but can add to axial strength), and a next portion 754 of the radial structure 704 provides stronger areas (where the beam junctions can be close to 90 degrees) that are readily usable in parts that need strength. FIG. 7D shows the example radial structure 714, in which an inner portion 762 of the structure 714 will have high stress levels approaching the center of the structure, a next portion 764 of the radial structure 714 provides stronger areas that are readily usable in parts that need strength, and an outer portion 766 can be used for softer areas of a part, such as for shock absorbing areas. Finally, FIG. 7E shows the example radial structure 724, in which an inner portion 772 of the structure 724 will have high stress levels approaching the center of the structure, a next portion 774 of the radial structure 724 provides stronger areas that are readily usable in parts that need strength, and an outer portion 776 can be used for softer areas of a part, such as for shock absorbing areas or cushioning.

As can be seen, the spiral details selected to generate the radial lattice structure creates different regions of the lattice, with different sizes, that are more or less suitable for different applications. Note that the details of the appropriate uses of the different portions of the various radial lattice structures can be determined using FEA techniques to simulate the 3D lattices and portions thereof. Further, the radial lattice is not only suitable for parts that need rotational balance, but can also be used for other parts, such as for oval structures. Finally, referring back to FIG. 6, the check at 635 can include comparing the beam to beam angles in a single 3D lattice layer against different threshold angles to identify which areas of the lattice are appropriate to obtain different structural characteristics, and this can be flagged for the user to decide what portion of the 3D lattice to use, or undesirable portions of the 3D lattice can be automatically removed (e.g., delete beams toward the inside and outside of the radial lattice structure where the angle between the beams gets much smaller or much larger than 90 degrees and so may not provide a desirable level of strength in the AM built lattice structure). Note that these different threshold angles can also depend on the material(s) used by the AM machine to additively manufacture the beams of the lattice.

Once the 3D radial lattice structure is created and modified, as desired, it can be incorporated into a part of a 3D model. At 640, at least a portion of the 3D lattice (e.g., as specified by a user) is included in a 3D model of an object to be built by additive manufacturing. In general, the radial lattice is connected with "solid interfaces" (parts that are not typically changed). Moreover, a central solid (e.g., a rod or tube) can be used as a base and to set up boundary conditions for FEA analysis. The central solid interface can be used to automatically trim central, high-stressed beams. Thus, a 3D modeling program can be used to generate both a 3D model of an object and a radial lattice structure (which can be a rotationally balanced lattice) for inclusion therein before additive manufacturing.

Figure 9A:
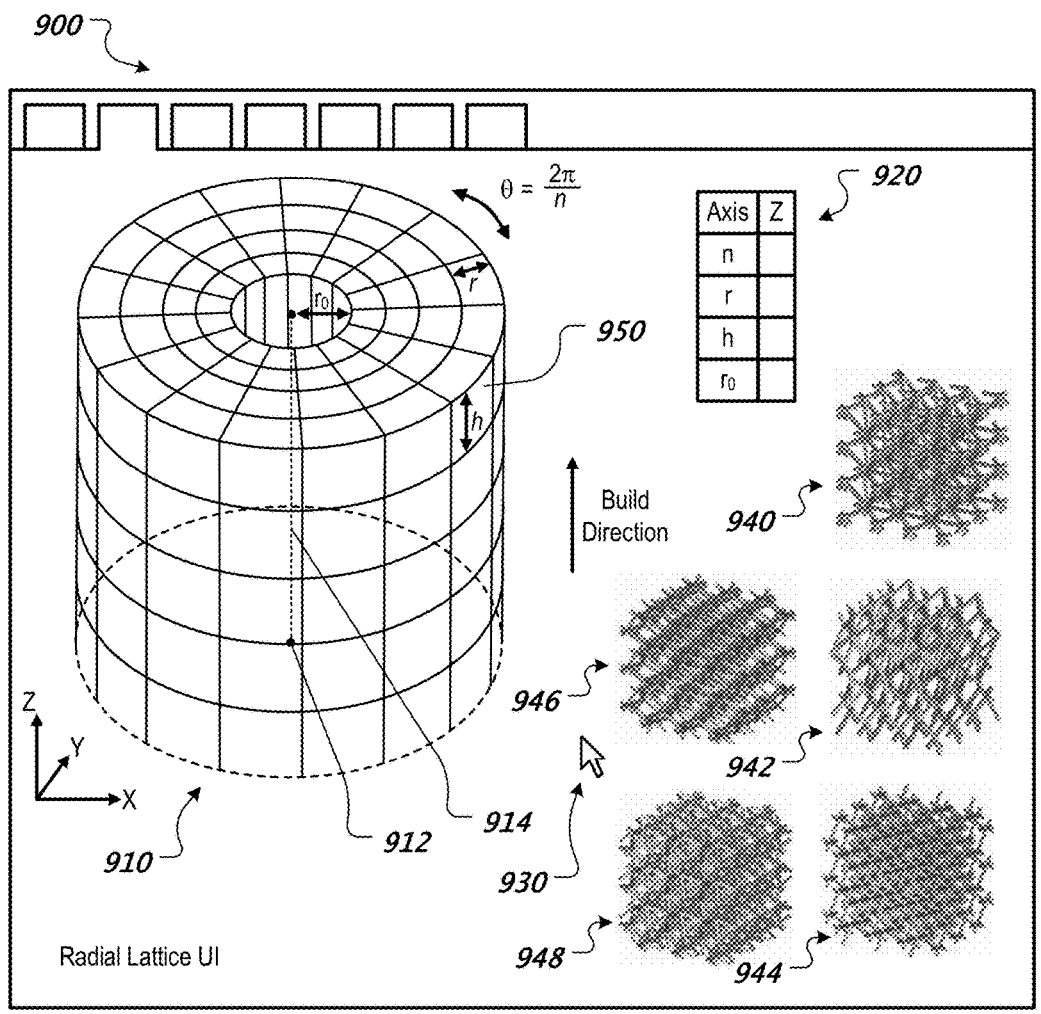
FIG. 9A shows an example of a user interface for designing 3D radial lattice structures in a 3D modelling program.

FIG. 9A shows an example of a user interface (UI) 900 for designing 3D radial lattice structures in a 3D modelling program. The radial lattice UI 900 can be a portion of a UI for designing lattices generally, or the radial lattice UI 900 can be a UI dedicated for use in designing radial lattices. The radial lattice UI 900 can include a graphical representation 910 of a radial grid extended from a center (origin) point 912 in a third dimension along an axis 914. Alternatively, or in addition, the radial lattice UI 900 can include data entry UI elements 920 where a user can select a UI field within the UI elements 920, using a cursor 930, and enter parameter values for generation of a radial lattice structure. Moreover, in some implementations, the parameters can be changed using a mouse (e.g., by dragging arrows in different directions) or using other input devices and techniques.

In some implementations, the 3D extended radial grid 910 is merely a display that previews the general properties of the radial lattice structure, with reference to X, Y & Z coordinates and a build direction, in response to data entered within the UI elements 920. This preview can include wireframes or other visualizations of the lattice beams as well and can also include other attributes such as colors or numbers to show the angles between the beams at the junctions in each layer of the radial lattice to allow the user to select the right parameter settings for the specific application and loading of the part. In other implementations, the 3D extended radial grid 910 is itself a UI element that can be manipulated to change the parameter values for generation of the radial lattice structure. For example, the 3D extended radial grid 910 (or the UI element showing the X, Y & Z coordinates) can be grabbed and rotated with the cursor 930 to change the axis. Note that the axis for the lattice generation can have its default be the Z direction, as shown in FIG. 9A, where the Axis field in the UI elements 920 is set to Z. Note that in many (if not all) embodiments, the additive manufacturing build direction and rotation axes are the same.

In some implementations, the UI elements 920 can be used to select one of the X, Y, or Z axes as the build direction, and then set parameter values for n, r, h, and/or $r_0$. In some implementations, portions of the 3D extended radial grid 910 can be grabbed and manipulated with the cursor 930 to change the values of n, r, h, and/or $r_0$. The value of n can be an integer that determines the number of lattice cells around the circumference of the circle. This integer value can be used to calculate the angle $$\theta = \frac{2\pi}{n}.$$

The value of r is the size of each lattice cell in the radial direction. In some implementations, r can change with the cell's distance from the center of the cylinder, rather than being a constant value for all lattice cells. For example, r can change linearly with the cell's distance from the center of the cylinder, and in some implementations, a starting r value and an ending r value can be specified, and for each cell in between the two end points, the r value can be calculated using linear interpolation between the starting and ending r values. Other functions and interpolation types (e.g., non-linear) can also be used. For example, a b-spline function can be used to define a non-linear function using a set of control points. The value of h is the size (height) of each lattice cell in the direction of the axis 914. Furthermore, in some implementations, h can change from cell to cell along the direction of the axis 914, rather than being a constant value for all lattice cells. As in the case for the r value, the h value can be determined using various functions and interpolation types (e.g., linear or non-linear interpolation) as well using starting and ending values, as described above for the r value.

In addition, $r_0$ can be used to set the minimum radius of the inner layer of the lattice cells. This specifies the size of the cylindrical hole inside the radial lattice structure. Once a user specifies the needed parameters (e.g., build direction, number of cells around the circumference of the cylinder, and cell sizes in millimeters), the cylindrical parametric space of the lattice units can be calculated using a cylindrical coordinate system and/or using the techniques described above (e.g., using an Archimedean spiral). Layers of the lattice units can be generated outwards from the origin 912 to cover the whole design space (the part that needs to be filled with the radial lattice), so there is no need to specify the maximum radius of the cylinder 910. Each radial lattice unit cell can then be filled with a lattice unit of a selected lattice topology. In some implementations, the user is presented with multiple available lattice topologies, which can be selected to create the beams in the radial lattice unit cells of the cylinder 910. In some implementations, a default lattice topology is used since it is known that a radially balanced structure is desired for use in additive manufacturing.

Note that the 3D extended radial grid 910 is a cylinder shell divided into curved hexahedrons, including one such hexahedron 950. This cylinder shell is rotationally symmetrical about the axis 914, and any lattice topology that will maintain this radial symmetry about the axis 914 can be used to generate a rotationally balanced structure with predictable volume distribution of the 3D lattice within the part. One such topology can be called "X topology" since it adds beams in a crisscross pattern. Other topologies can be used, and in particular, topologies that do not result in substantially horizontal beams (relative to the build direction) can be used without requiring support during the build. Examples of topologies that can be used are shown in FIG. 9A (in association with a cube shaped cells rather than curved hexahedrons) and include W 940, dark horse 942, soft-box 944, rhombic dodecahedron 946, icosahedron 948, etc. Such topologies can still achieve the self-supporting aspect with certain Z dimension (build direction). Thus, such alternative beam topologies can also be used to create self-supporting, mechanically robust and efficient lattice structures that are rotationally balanced and manufacturable using additive manufacturing systems and techniques.

Figure 9B:
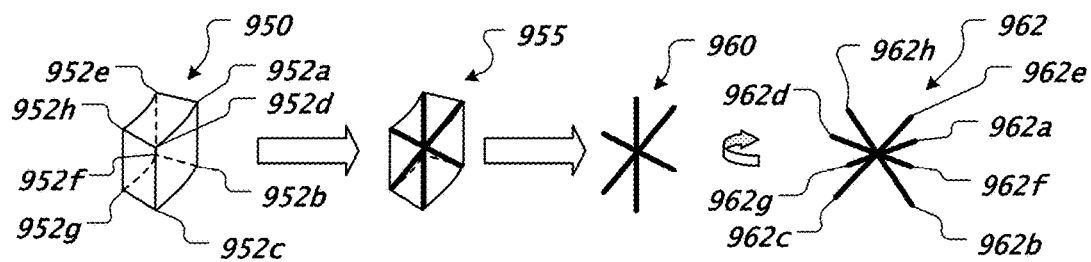
FIG. 9B shows an example of generating a unit cell of a 3D radial lattice structure in a 3D modelling program.

FIG. 9B shows an example of generating a unit cell of a 3D radial lattice structure in a 3D modelling program. The unit cell is the hexahedron 950 from FIG. 9A. A hexahedron is a 3D object having six faces, and so is similar to a cube or cuboid. However, in this case, each hexahedron unit has a particular shape in relation to the axis 914. Specifically, each hexahedron is a sector of an annulus that has been extended in the third dimension parallel with the axis 914; note that each annulus is the space between two concentric circles on a plane, to which the axis 914 is normal.

The hexahedron 950 has eight corners 952a, 952b, 952c, 952d, 952e, 952f, 952g, 952h defined by the intersections of its six faces. Beams for the lattice can be generated within each such unit cell 950 by connecting these eight corners 952a, 952b, 952c, 952d, 952e, 952f, 952g, 952h in a crisscross pattern (i.e., beams between coordinate pairs {952a, 952g}, {952d, 952f}, {952e, 952c}, and {952h, 952b}). Thus, the unit cell 950 becomes the lattice cell 955. In various implementations, more or fewer lattice beams can be used. For example, the edges of the faces of the hexahedron can be turned into beams (i.e., eight straight beams between {952a, 952e}, {952d, 952h}, {952c, 952g}, {952b, 952f}, {952a, 952b}, {952e, 952f}, {952h, 952g}, and {952d, 952c}, plus four curved beams between {952a, 952d}, {952e, 952h}, {952f, 952g}, and {952b, 952c}), or the eight corners 952a, 952b, 952c, 952d, 952e, 952f, 952g, 952h can be connected by a straight beam along each of the edges (i.e., twelve straight beams between the coordinate pairs noted above).

In the example shown, only the crisscross pattern is used, and so when the hexahedron 950 from the 3D extended radial grid 910 is removed, the lattice unit 960 remains to connect with the lattice units from the other hexahedrons of the 3D extended radial grid to form the radial lattice structure. To further illustrate the crisscross pattern, the lattice unit 960 is rotated about fifty degrees clockwise (from the top) in FIG. 9B to show a new perspective 962 of the lattice unit 960. As shown, there are four lattice beams within the lattice unit: beam {962a, 962g} connecting corners 952a and 952g, beam {962d, 962f} connecting corners 952d and 952f, beam {962e, 962c} connecting corners 952e and 952c, and beam {962h, 962b} connecting corners 952h and 952b.

Figure 8:
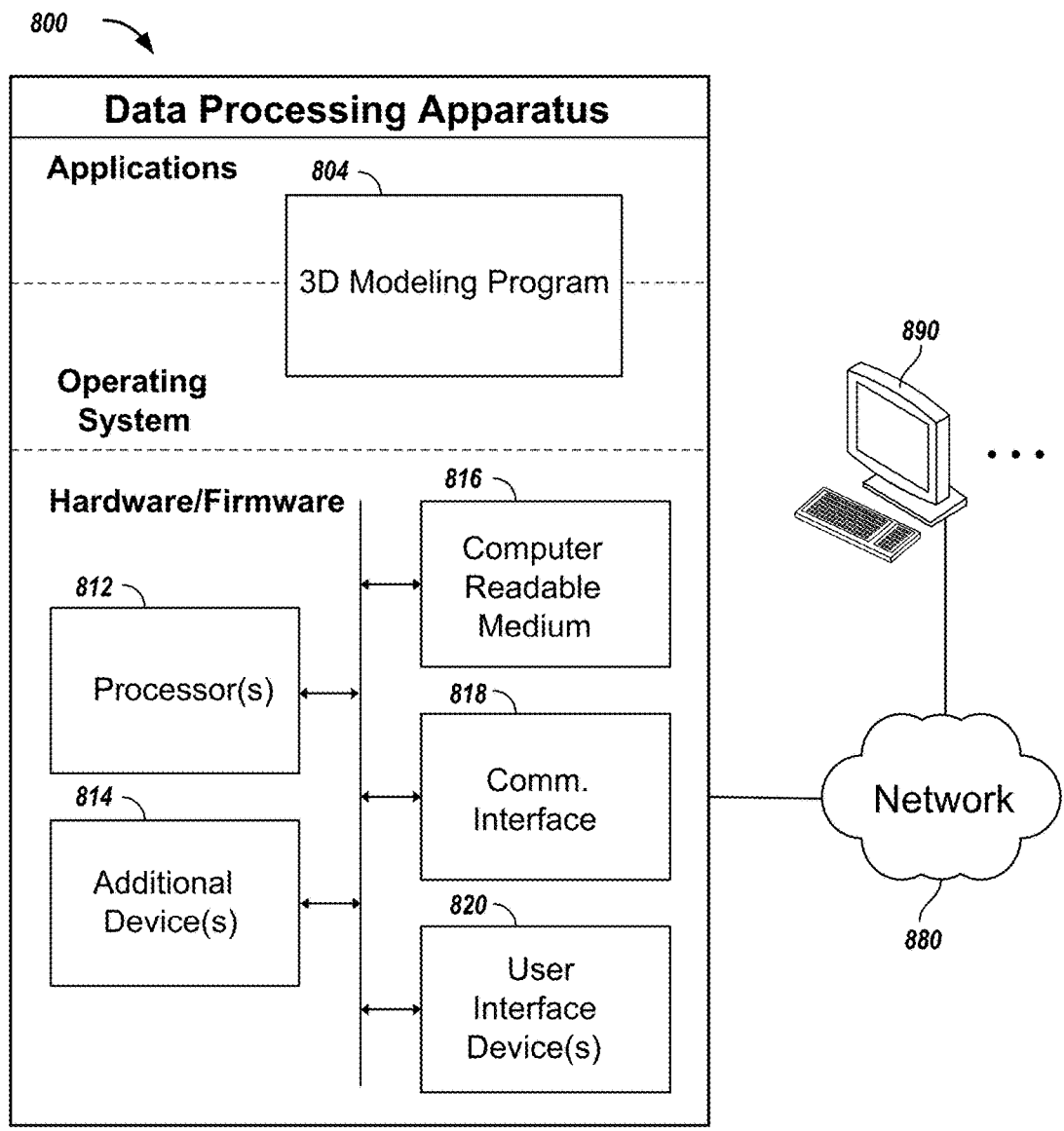
FIG. 8 is a schematic diagram of a data processing system.

FIG. 8 is a schematic diagram of a data processing system including a data processing apparatus 800, which can be programmed as a client or as a server. The data processing apparatus 800 is connected with one or more computers 890 through a network 880. While only one computer is shown in FIG. 8 as the data processing apparatus 800, multiple computers can be used. The data processing apparatus 800 includes various software modules, which can be distributed between an applications layer and an operating system. These can include executable and/or interpretable software programs or libraries, including tools and services of a 3D modeling program 804, such as described above. The number of software modules used can vary from one implementation to another. Moreover, the software modules can be distributed on one or more data processing apparatus connected by one or more computer networks or other suitable communication networks.

The data processing apparatus 800 also includes hardware or firmware devices including one or more processors 812, one or more additional devices 814, a computer readable medium 816, a communication interface 818, and one or more user interface devices 820. Each processor 812 is capable of processing instructions for execution within the data processing apparatus 800. In some implementations, the processor 812 is a single or multi-threaded processor. Each processor 812 is capable of processing instructions stored on the computer readable medium 816 or on a storage device such as one of the additional devices 814. The data processing apparatus 800 uses its communication interface 818 to communicate with one or more computers 890, for example, over a network 880. Examples of user interface devices 820 include a display, a camera, a speaker, a microphone, a tactile feedback device, a keyboard, and a mouse. The data processing apparatus 800 can store instructions that implement operations associated with the modules described above, for example, on the computer readable medium 816 or one or more additional devices 814, for example, one or more of a floppy disk device, a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A physical object created by additive manufacturing, the physical object comprising:
multiple beams connected with each other at junction points to form a lattice of the physical object;
wherein the beams of the lattice correspond to a duplicated three dimensional (3D) structure;
wherein the 3D structure has (i) first sets of junction points at a first location along an axis for the 3D structure, and (ii) second sets of junction points at a second location, which is different from the first location, along the axis for the 3D structure; and
wherein, when projected into a two dimensional (2D) plane normal to the axis, the first sets of junction points alternate with the second sets of junction points at successive radii positions away from the axis in the 2D plane normal to the axis.

2. The physical object of claim 1, wherein the first sets of junction points and the second sets of junction points have projection locations in the 2D plane that correspond to an Archimedean spiral.

3. The physical object of claim 1, wherein the first sets of junction points and the second sets of junction points have projection locations in the 2D plane that correspond to a piecewise spiral.

4. The physical object of claim 1, comprising additional beams connected with the junction points.

5. The physical object of claim 1, wherein the first sets of junction points and the second sets of junction points have projection locations in the 2D plane determined by one or more input parameters for a spiral.

6. The physical object of claim 5, wherein the beams of the lattice are formed from only a portion of the duplicated 3D structure.

7. A method comprising:
creating nodes in a plane normal to an axis in accordance with a spiral, wherein proper subsets of the nodes occur at successive radii positions away from the axis in the plane normal to the axis;
repositioning every other one of the proper subsets, from at least a portion of the nodes, in a direction in 3D space along the axis;
creating a three dimensional (3D) structure in the 3D space, the 3D structure comprising beams placed between the repositioned and non-repositioned proper subsets;
duplicating the 3D structure one or more times to form a lattice in the 3D space; and
selecting at least a portion of the lattice for inclusion in a 3D model.

8. The method of claim 7, wherein the spiral is a spiral with constant separation distance between successive turns of the spiral, and creating the nodes in the plane comprises:
creating the spiral;
replicating the spiral with rotation in the plane normal to the axis;
mirroring the replicated spiral; and
using intersection points of the replicated and mirrored spirals as the nodes in the plane normal to the axis.

9. The method of claim 8, wherein the spiral is an Archimedean spiral.

10. The method of claim 7, wherein the spiral is a piecewise spiral, and creating the nodes in the plane comprises:
creating a first portion of the nodes from a radial grid; and
creating a second portion of the nodes by connecting the first portion of the nodes in a crisscross pattern.

11. The method of claim 7, comprising:
placing additional beams between the repositioned proper subsets to form the 3D structure in the 3D space; and
adding additional beams between the non-repositioned proper subsets to form the 3D structure in the 3D space.

12. The method of claim 7, comprising selecting the portion of the nodes from which to reposition the proper subsets, selecting a portion of the lattice for inclusion in the 3D model, or both.

13. The method of claim 12, wherein moving every other one of the proper subsets comprises moving each node a distance equal to an average of distances between the nodes in the plane normal to the axis.

14. A system comprising:
a non-transitory storage medium having instructions of a three dimensional (3D) modeling program stored thereon; and
one or more data processing apparatus configured to run the instructions of the 3D modeling program to (i) obtain an axis of rotation for a part of a 3D model of an object to be built using an additive manufacturing apparatus, (ii) receive values for at least one size parameter to govern lattice cell size and an angle parameter to govern a number of wedges about the axis of rotation, (iii) generate nodes in 3D space using the axis of rotation and the received values, (iv) add beams connecting the nodes to form a rotationally balanced lattice in the 3D space, and (v) provide at least a portion of the rotationally balanced lattice for inclusion in the part of the 3D model of the object.

15. The system of claim 14, wherein the one or more data processing apparatus are configured to run the instructions of the 3D modeling program to generate the nodes in the 3D space using a spiral with constant separation distance between successive turns of the spiral.

16. The system of claim 15, wherein the spiral is an Archimedean spiral.

17. The system of claim 14, wherein the one or more data processing apparatus are configured to run the instructions of the 3D modeling program to generate the nodes in the 3D space using a radial grid extended in a direction of the axis of rotation.

18. The system of claim 17, wherein the one or more data processing apparatus are configured to run the instructions of the 3D modeling program to add the beams by connecting nodes of the extended radial grid in a crisscross pattern.

19. The system of claim 18, wherein the one or more data processing apparatus are configured to run the instructions of the 3D modeling program to add the beams by further connecting nodes of the extended radial grid along straight and circular edges of the extended radial grid.

20. The system of claim 14, wherein the one or more data processing apparatus are configured to run the instructions of the 3D modeling program to receive (i) an integer input for the number of lattice cells around a circumference, (ii) a lattice cell size in the radial direction, (iii) a lattice cell size along the axis of rotation, and (iv) a minimum radius of an inner most boundary of the rotationally balanced lattice.

21. The system of claim 20, wherein the received lattice cell size in the radial direction and the received lattice cell size along the axis of rotation are both held constant for all lattice cells of the rotationally balanced lattice.

22. The system of claim 14, wherein the one or more data processing apparatus are configured to run the instructions of the 3D modeling program to enable selection of a portion of the rotationally balanced lattice for inclusion in the part of the 3D model of the object, and enable deformation of the rotationally balanced lattice either before or after the selection of the portion.

23. The system of claim 14, further comprising the additive manufacturing apparatus, wherein the one or more data processing apparatus are configured to run the instructions of the 3D modeling program to generate the 3D model of the object with the rotationally balanced lattice included in the part of the 3D model.

24. The system of claim 14, wherein the one or more data processing apparatus are configured to run the instructions of the 3D modeling program to enable selection of a lattice topology, wherein the added beams connecting the nodes correspond to the selected lattice topology, and the rotationally balanced lattice comprises a self-supporting, mechanically robust and efficient lattice structure that is manufacturable using additive manufacturing systems and techniques.

\* \* \* \* \*

UNITED STATES PATENT AND TRADEMARK OFFICE
CERTIFICATE OF CORRECTION

| | |
|---|---|
| PATENT NO. | : 10,363,703 B2 |
| APPLICATION NO. | : 14/997122 |
| DATED | : July 30, 2019 |
| INVENTOR(S) | : Andriy Banadyha and Hooman Shayani |

It is certified that error appears in the above-identified patent and that said Letters Patent is hereby corrected as shown below:

On the Title Page

Item (12) should read as follows:
Banadyha et al.

Column 1, item (72) Inventors, Line 1 the Inventors should read as follows:
Andriy Banadyha, Uxbridge (GB)
Hooman Shayani, Longfield (GB)

Signed and Sealed this
Thirty-first Day of May, 2022

*Katherine Kelly Vidal*

Katherine Kelly Vidal
*Director of the United States Patent and Trademark Office*